United States Patent [19]

Stöckel

[11] 4,139,140

[45] Feb. 13, 1979

[54] METHOD FOR PRODUCING AN ELECTRICAL CONTACT ELEMENT

[75] Inventor: Dieter Stöckel, Birkenfeld, Fed. Rep. of Germany

[73] Assignee: G. Rau, Pforzheim, Fed. Rep. of Germany

[21] Appl. No.: 826,193

[22] Filed: Aug. 19, 1977

[30] Foreign Application Priority Data

Sep. 21, 1976 [DE] Fed. Rep. of Germany ....... 2642338

[51] Int. Cl.² ........................ B23K 21/02; H01R 43/02

[52] U.S. Cl. .................................. 228/110; 29/630 C

[58] Field of Search ............... 228/110, 111; 29/630 C

[56] References Cited

U.S. PATENT DOCUMENTS

| | | | |
|---|---|---|---|
| 2,946,119 | 7/1960 | Jones et al. | 228/110 |
| 3,330,026 | 7/1967 | Best et al. | 228/111 |
| 3,461,542 | 8/1969 | Schoenthaler | 228/110 |
| 3,531,852 | 10/1970 | Slemmons | 228/110 |
| 4,019,876 | 4/1977 | Stöckel et al. | 228/110 X |

*Primary Examiner*—Al Lawrence Smith
*Assistant Examiner*—K. J. Ramsey
*Attorney, Agent, or Firm*—Wenderoth, Lind & Ponack

[57] ABSTRACT

A contact element is produced by sonically welding one or more contact pieces onto a carrier, an intermediate layer, for example of aluminium foil, being interposed between the contact piece and the carrier prior to such welding in order to assist in the welding of the contact pieces made of material which would otherwise be difficult to weld. Typical frequencies of sonic welding lie in the range between 20 kHz and 50 Hz.

3 Claims, 1 Drawing Figure

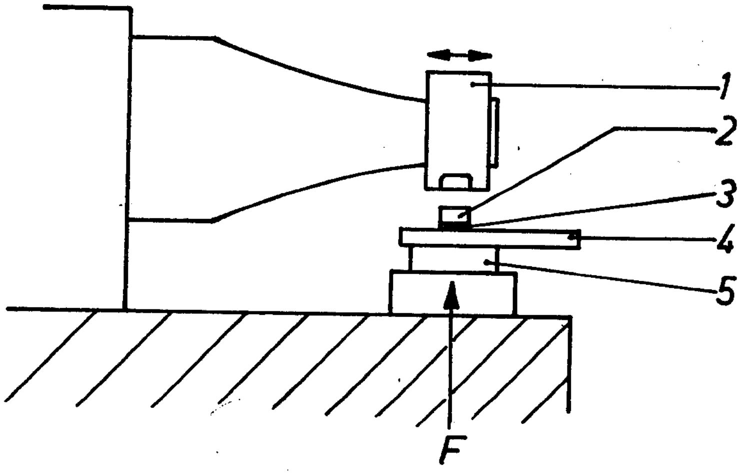
1
2
3
4
5
F

METHOD FOR PRODUCING AN ELECTRICAL CONTACT ELEMENT

BACKGROUND OF THE INVENTION

The invention relates to a method for producing an electrical contact element of the type in which at least one contact piece is joined to a carrier by welding.

In order to avoid welding during electrical switching operations of the contact elements, it is desirable that the contact pieces are produced from contact materials which do not weld easily. If such contact elements are used, difficulty can be experienced when joining the contact pieces to the carrier by brazing or welding. This is particularly true of composite materials comprising silver containing non-metallic inclusion, for example, AgCdO, $AgSnO_2$, AgMgO and AgC, that are often used as contact materials. These contact materials contain, embedded in the silver matrix material, non-metallic particles of cadmium oxide, tin oxide or magnesium oxide, for example, and these inclusions may take the form of fibre-like strands lying at right-angles to the eventual contact surface of the contact piece. Although the non-metallic inclusions have the desired effect of offering considerable resistance to welding during the switching operation, their use leads to considerable difficulties in the joining of the contact materials when the existing welding or brazing methods are employed.

It is known, for the purpose of securing contact pieces of fusion-resisting material to a carrier, to provide the contact piece with a readily weldable or brazable layer on its rear face i.e. that face which faces the carrier. Intermediate layers of this kind can be produced by various known methods. In the case of internally oxidized material, it is possible to form the weldable or brazable layer by, for example, oxidation on the rear face of the silver layer or by prior cladding of the rear face. Another known possible method involves the production by powder metallurgy of a brazable or weldable intermediate layer by multi-layer pressing or by converting multi-layer ingots to the required size and shape. The production of such contact pieces having weldable or brazable rear face is very complicated and costly.

It is also known to connect contact materials, having poor welding properties, directly to a carrier by ultrasonic welding. The ultrasonic welding process offers advantages as regards the low thermal loading of the contact material, but in many cases does not result in satisfactory shear strength when the contact pieces and the carrier material are directly joined to each other. Certain favourable combinations of material, i.e. AgCdO and brass, cannot be joined together sufficiently firmly by means of the existing ultrasonic welding techniques.

One ultrasonic welding method includes a procedure for joining aluminum electric conductors wherein the contact zones are first covered with a contact foil by ultrasonic spot-welding of ultrasonic roller-welding. A soldered, screw-type or clamp-type connector is then provided at the connection zones thus prepared. Composite foils of copper and aluminum, or gold or silver foils are used as the contact foils. The connection of contact pieces to the carrier, previously clad by means of ultrasonic welding, is difficult and is costly to carry out on a mass-production basis.

SUMMARY OF THE INVENTION

The object of the present invention is to provide a method for producing an electrical contact element in which at least one contact piece is joined to a carrier by welding, a high-strength connection being present between the contact piece and the carrier.

An electrical element comprising at least one contact piece is joined to a carrier by sonic welding, and an intermediate layer of a cold-weldable metallic material is inserted between the or each contact piece and the carrier prior to sonic welding.

In such sonic welding, using frequencies in the sonic range of between approximately 20 kHz and 50 Hz, and particularly when readily cold-weldable intermediate layers are used, a surprisingly solid joint between the contact piece and the carrier is achieved. Compared with an ultra-sonic welding procedure, sonic welding, particularly at low frequencies, offers the possibility of using higher energy in the welding operation. The intermediate layer may consist either of a pure metal, preferably aluminum but optionally silver, copper or titanium, or of a metal alloy having similar properties, for example, an aluminum-copper alloy. It has been found that for the usual dimensions of contact elements, the thickness of the intermediate layer should advantageously be less than 1 mm, and preferably less than 0.2 mm.

In some circumstances, a further considerable advantage can be achieved if the intermediate layer is a powder layer. The thickness of the layer is preferably below 100 $\mu$m. The layer may consist of one or more components having good cold-welding properties.

The contact element preferably may comprise a contact piece made of silver-cadmium oxide joined to a brass carrier by way of an aluminum intermediate layer consisting of a foil or powder.

BRIEF DESCRIPTION OF THE DRAWING

The accompanying drawing is a diagrammatical side elevation of an ultrasonic welding machine suitable for manufacturing the electrical contact elements according to the process of the present invention.

DETAILED DESCRIPTION OF THE INVENTION

The machine comprises a sonic oscillator 1, whose main direction of oscillation is indicated by the arrow F. Small contact pieces in the form of plates 2 are joined in turn to a brass carrier strip 4, an aluminum foil 3 or an aluminum powder applied by dusting being interposed between the plates and the strip to form the intermediate layer. The required welding pressure is applied by way of an anvil 5. The individual contact plates 2 were fed from a supply container by way of a suitable feed chute (not shown) onto the surface of the aluminum foil 3. The direction of advance of the aluminum foil 3 and of the carrier 4 is indicated by a double-ended arrow.

In accordance with one aspect of the invention there is provided a method of producing a contact element as described above, the method comprising inserting the metal foil between the contact piece and the carrier for the purpose of forming the intermediate layer, and applying pressure while carrying out sonic welding.

Preferably the metal foil is inserted loosely between the contact piece and the carrier. The contact piece is advantageously placed on a cut piece of foil which is larger than the peripheral contour of the contact piece. Then, during sonic welding, a piece having the same size as the contact piece can be separated from the foil and the unrequired foil can be removed.

The thickness of the foil is in the order of magnitude of the thickness of the intermediate layer, i.e. advantageously below 1 mm and preferably below 0.2 mm. During the welding operation and because of the high pressure and the frictional movement under the effect of the sonic vibration, a precisely matching piece, corresponding to the size of the area over which the contact piece is connected, is rubbed out of the foil, and the excess foil material can be removed in a particularly simple manner. If so required, the foil may consist of cut pieces corresponding to the size of the area over which the connection is to be made.

It is possible to adapt the method of this invention to continuous production by continuously feeding the carrier and the foil together continuously in the form of strip, sonic welding being carried out on each of the contact pieces in turn after they have been placed in position, and the excess foil material being then removed from the carrier which is in the form of strip. Additional continuous advance of the contact material in wire or strip form appears to be advantageous in some circumstances. The use of the above-described method has provided, among other things, a novel contact element wherein a joint having high shear strength was obtained between a contact piece made of AgCdO and an intermediate layer made of aluminum foil and laid on a brass carrier.

In accordance with a further aspect of the invention there is provided a method of producing a contact element as described above, the method comprising inserting metal powder between the contact piece and the carrier for the purpose of forming the intermediate layer, and applying pressure while carrying out sonic welding.

The powdered constituents of the intermediate layer may be placed loose on the carrier, or may be dusted onto the contact piece and/or the carrier or may be mixed with a binding agent and painted onto the contact piece and/or carrier. The use of, for example, the well-known material, aluminum-bronze, which contains a partially volatile binding agent, has been found to be advantageous. When the powder for forming the intermediate layer is loosely heaped, the excess is usually pressed out sideways during the sonic welding operation, so that small differences in measuring out the quantity of powder do not interfere with the formation of the required intermediate layer responsible for adherence. The thickness of the powder layer prior to welding is preferably less than 100 $\mu$m. In some cases, complete cohesion with a uniform layer is not necessary and it suffices to provide islands of powder with irregular spaces between them.

The contact pieces produced in accordance with the invention exhibit advantageous properties in many of their applications. They can be manufactured economically as mass-produced articles and permit the use of contact materials having a considerable capacity for resisting fusion. Since the parts to be connected are not heated to any considerable extent during sonic welding, the original mechanical properties of the carrier and the contact piece are for the most part retained.

EXAMPLE I

A small contact piece in the form of a plate made of AgCdO, in which were incorporated non-metallic cadmium oxide components in a silver matrix material, had a diameter of 4.5.mm and a thickness of 1.4 mm. After a pure aluminium foil having a thickness of 0.1 mm had been interposed, this contact piece was joined by sonic welding to a carrier consisting of a brass strip, 8 mm in width and 0.7 mm in thickness. The output of the sonic oscillator was 1200 W and the frequency 18 kHz. A compressive force of approximately 736 N was applied during the welding operation. The welding time was 1.5 sec. During welding the residual portion of the aluminium foil became detached at the edge of the surface over which the joint was made, and was removed. The shear strength of the welded joint was approximately 80 N/mm$^2$.

An attempt to join the AgCdO contact plate directly to the brass carrier by sonic welding met with no success and resulted in no adherence at all.

EXAMPLE II

A small contact piece in the form of a plate of AgCdO in which were incorporated non-metallic cadmium oxide components contained in a silver matrix material, had a diameter of 8 mm and a thickness of 1.5 mm. After a layer of pure aluminium powder, having a particle-size of less than 10 $\mu$m, had been heaped on the plate, the contact piece was joined by sonic welding to a carrier consisting of a brass strip having a width of 10 mm and a thickness of 2 mm.

The output of the sonic oscillator was 4000 W and the frequency 10 kHz. During the welding operation a compressive force of approximately 1000 N was applied. The welding time was 0.1 sec.

The shear strength of the welded joint was approximately 100 N/mm$^2$.

I claim:

1. A method for producing a contact element of the type including at least one contact piece joined to a carrier, said method comprising:

positioning a layer of cold-weldable metal powder between said contact piece and said carrier; and applying pressure between said contact piece and said carrier while applying thereto sonic welding at a frequency of approximately from 50 Hz to 20 kHz, thereby welding said contact piece to said carrier with said metal powder therebetween as an intermediate layer.

2. A method as claimed in claim 1, wherein said metal powder includes a binding agent.

3. A method as claimed in claim 1, wherein the thickness of said layer of metal powder before the sonic welding operation is less than 100 $\mu$m.

* * * * *